US010362470B2

(12) United States Patent
Bostick et al.

(10) Patent No.: US 10,362,470 B2
(45) Date of Patent: Jul. 23, 2019

(54) SAFE STATUS MESSAGE DELIVERY

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/474,311

(22) Filed: Mar. 30, 2017

(65) Prior Publication Data
US 2018/0288581 A1 Oct. 4, 2018

(51) Int. Cl.
*H04W 4/90* (2018.01)
*H04W 4/12* (2009.01)
*H04L 12/58* (2006.01)

(52) U.S. Cl.
CPC ............. *H04W 4/90* (2018.02); *H04L 51/32* (2013.01); *H04W 4/12* (2013.01); *H04M 2250/12* (2013.01)

(58) Field of Classification Search
CPC .......... H04W 4/90; H04W 4/02; H04W 4/12; H04M 1/72572; H04M 2250/12; H04M 1/72538; H04L 51/32; G06F 19/00; G06F 19/3418; G08B 25/016
See application file for complete search history.

(56) References Cited

U.S. PATENT DOCUMENTS

| 9,119,027 | B2 | 8/2015 | Sharon et al. |
| 9,668,096 | B2 * | 5/2017 | Philips .................. H04W 4/021 |
| 9,852,599 | B1 * | 12/2017 | Slavin ..................... H04W 4/90 |
| 2012/0066139 | A1 | 3/2012 | Guzman et al. |
| 2014/0122053 | A1 | 5/2014 | Lotan et al. |
| 2016/0203123 | A1 | 7/2016 | Kozloski et al. |
| 2016/0335410 | A1 * | 11/2016 | Swank ................ G06F 19/3418 |
| 2017/0086050 | A1 * | 3/2017 | Kerning .................. H04W 4/22 |
| 2018/0032997 | A1 * | 2/2018 | Gordon ............. G06Q 20/3224 |

OTHER PUBLICATIONS

D. Alba, "Facebook's New Tool Tells Friends You're Safe During Natural Disasters," http://www.wired.com/2014/10/facebook-unveils-tool-alerting-friends-safety-natural-disaster/.
Weather Decision Technologies, Inc., "Weather Radio by WDT," https://itunes.apple.com/us/app/imapweather-radio/id413511993.
Ultimate Communication Software Ltd, "Red Panic Button," https://itunes.apple.com/app/red-panic-button/id422029296?mt=8.

* cited by examiner

*Primary Examiner* — George Eng
*Assistant Examiner* — Hung K Du
(74) *Attorney, Agent, or Firm* — Christopher K. McLane, Esq.; George S. Blasiak, Esq.; Heslin Rothenberg Farley & Mesiti PC

(57) ABSTRACT

Methods, computer program products, and systems are presented. The methods computer program products, and systems can include, for instance: obtaining emergency event data and user data of a mobile device user, wherein the user data of the mobile device user includes user biometric data obtained from a mobile device of the mobile device user; examining data of the emergency event data and data of the user data; and responsively to the examining, automatically outputting one or more text based status message.

18 Claims, 8 Drawing Sheets

SAFE STATUS MESSAGE DELIVERY

BACKGROUND

The present disclosure relates generally to the field of emergency management systems, and more particularly to emergency communications.

Emergency management is the function of reducing vulnerability to and coping with emergencies. Examples of events covered by emergency management include acts of terrorism, industrial sabotage, fire, natural disasters, public disorder, industrial accidents, and communication failures. An emergency management system (or "EMS", also known as an emergency management information system) is a computer system for emergency management that provides real-time information to responders.

SUMMARY

Shortcomings of the prior art are overcome, and additional advantages are provided, through the provision, in one aspect, of a method. The method can include, for example: obtaining emergency event data and user data of a mobile device user, wherein the user data of the mobile device user includes user biometric data obtained from a mobile device of the mobile device user; examining data of the emergency event data and data of the user data, wherein the examining includes activating a user location classifier process that uses location data of the mobile device and geofence data determined from the data of the emergency event data to classify a location of the mobile device user, and wherein the activating further includes activating a vital signs classifier process that uses biometric data obtained from the mobile device to classify a vital sign condition of the mobile device user; and responsively to the examining, automatically outputting one or more text based status message specifying a status of the mobile device user, wherein the automatically outputting includes activating a status message generating process that generates a text based message based on an output of the user location classifier process and the vital signs classifier process.

In another aspect, a computer program product can be provided. The computer program product can include a computer readable storage medium readable by one or more processing unit and storing instructions for execution by one or more processor for performing a method. The method can include, for example: obtaining emergency event data and user data of a mobile device user, wherein the user data of the mobile device user includes user biometric data obtained from a mobile device of the mobile device user; examining data of the emergency event data and data of the user data, wherein the examining includes activating a user location classifier process that uses location data of the mobile device and geofence data determined from the data of the emergency event data to classify a location of the mobile device user, and wherein the activating further includes activating a vital signs classifier process that uses biometric data obtained from the mobile device to classify a vital sign condition of the mobile device user; and responsively to the examining, automatically outputting one or more text based status message specifying a status of the mobile device user, wherein the automatically outputting includes activating a status message generating process that generates a text based message based on an output of the user location classifier process and the vital signs classifier process.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining emergency event data and user data of a mobile device user, wherein the user data of the mobile device user includes user biometric data obtained from a mobile device of the mobile device user; examining data of the emergency event data and data of the user data, wherein the examining includes activating a user location classifier process that uses location data of the mobile device and geofence data determined from the data of the emergency event data to classify a location of the mobile device user, and wherein the activating further includes activating a vital signs classifier process that uses biometric data obtained from the mobile device to classify a vital sign condition of the mobile device user; and responsively to the examining, automatically outputting one or more text based status message specifying a status of the mobile device user, wherein the automatically outputting includes activating a status message generating process that generates a text based message based on an output of the user location classifier process and the vital signs classifier process.

Shortcomings of the prior art are overcome, and additional advantages are provided, through the provision, in one aspect, of a method. The method can include, for example: obtaining emergency event data and user data of a mobile device user; examining data of the emergency event data and data of the user data; and responsively to the examining, automatically outputting one or more status message specifying a status of the mobile device user.

In another aspect, a computer program product can be provided. The computer program product can include a computer readable storage medium readable by one or more processing unit and storing instructions for execution by one or more processor for performing a method. The method can include, for example: obtaining emergency event data and user data of a mobile device user; examining data of the emergency event data and data of the user data; and responsively to the examining, automatically outputting one or more status message specifying a status of the mobile device user.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining emergency event data and user data of a mobile device user; examining data of the emergency event data and data of the user data; and responsively to the examining, automatically outputting one or more status message specifying a status of the mobile device user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
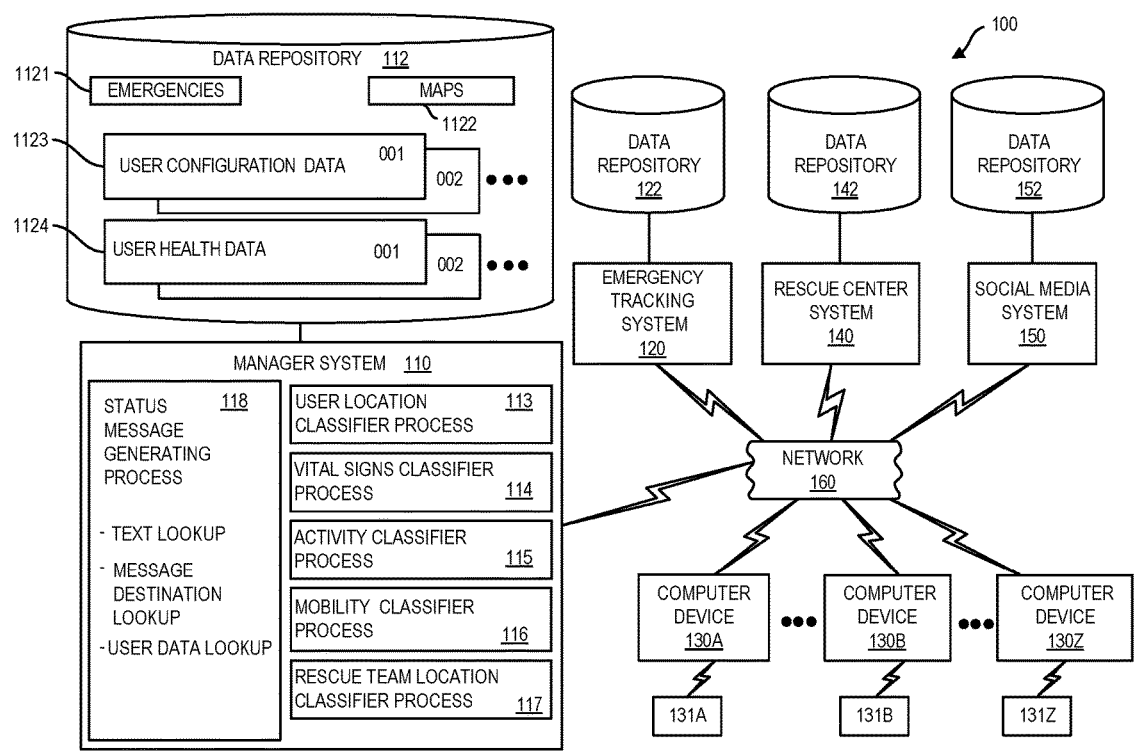
FIG. 1 depicts a system having manager system and other systems in a computer network environment in one embodiment.

FIG. 1 is a block diagram of a system 100, in accordance with an embodiment as set forth herein. In the embodiment of FIG. 1, system 100 includes numerous devices, which may be or include computing nodes 10 as described herein, connected by a network 160. For example, network 160 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 1 depicts an example environment. In one embodiment, system 100 can include manager system 110, one or more emergency tracking system 120, one or more rescue center system 140, one or more social media system 150, and various user computer devices 130A, 130B-130Z. Computer devices 130A, 130B-130Z can have associated wearable computer devices 1301A, 131B-131Z. Wearable computer device 131A can be associated to computer device 130A, wearable computer device 131B can be associated to computer device 130B, and wearable computer device 131Z can be associated to computer device 130Z. Wearable computer devices 1301A, 131B-131Z can be provided by smartwatches in one embodiment. In one embodiment a wearable computer device can include biometric sensor data e.g. a pulsometer that persistently remains in proximity with the user. Wearable computer devices 131A, 131B, and 131Z in one embodiment can be paired to their respective computer devices 130A, 130B, and 130Z so that data output by wearable computer device is automatically uploaded to its respective computer device. In one embodiment manager system 110 can be external to social media system 150 and to each of the one or more user computer device 130A-130Z. In one embodiment manager system 110 can be co-located with social media system 150 or another social media system. In one embodiment manager system 110 can be co-located with one or more user computer device 130A-130Z. Manager system 110 can have an associated data repository 112, emergency tracking system 120 can have an associated data repository 122, rescue center system 140 can have an associated data repository 142 and social media system 150 can have an associated data repository 152.

Manager system 110 can include an associated data repository 112. Data repository 112 can store various data e.g. data on emergencies in emergencies area 1121 and data on coordinate locations of points of interest in maps area 1122. Data of emergencies area 1121 and maps area 1122 can be periodically received from e.g. from emergency tracking system 120 and/or an additional external system (not shown) of system 100 external to manager system 110. Data repository 112 can store in area 1123 user configuration data that can be defined by a user. User configuration data can include such data as persons and/or groups to whom status message data is to be sent in the event of an emergency. Data repository 112 can store in area 1124 user health data, for example user can elect to upload into manager system 110, a variety of health data that may be useful for a rescue team to consult in the event of an emergency e.g. data on age, health condition, medicines, medical conditions. Health data 1124 can be updated as system 100 is used to include e.g. biometric data obtained from user computer devices 130A-130Z. Manager system 110 can be operative to run various user classifier processes e.g. a user location classifier process 113, a vital signs classifier process 114, an activity classifier process 115, a mobility classifier process 116, and a rescue team location classifier process 117. Manager system 110 can also be operative to run a status message generating process 118. Status message generating process 118 can include e.g. a text lookup subprocess that uses one or more outputs from one or more classifier process, a message destination lookup sub process that can use user configuration data to determine persons and/or groups to whom status messages are to be delivered, and a user data lookup subprocess e.g. which may be used to assemble health data for sending to a rescue team.

Regarding one or more user computer device 130A, 130B-130Z, a computer device of one or more user computer device 130A, 130B-130Z in one embodiment can include a computing node 10 provided by a client computer, e.g. a mobile device, e.g. a smartphone or tablet, or laptop that runs one or more program. Regarding one or more user computer device 131A, 131B-131Z, a computer device of one or more user computer device 131A, 131B-131Z in one embodiment can include a computing node 10 provided by a wearable client computer, e.g. a smartwatch.

With further reference to FIG. 1, social media system 150 can include an associated data repository 152. In another aspect manager system 110 can include an associated data repository 112. Social media system 150 can store in data repository 112 a collection of files, including for example, HTML files, CSS files, image files, and JavaScript files. Social media system 150 can include a social media website. Repository 152 of social media system 150 can include user data for various users, e.g. users. Repository 152 can store for each of several users such content as media files and user profile data. Media files can include e.g. video files, image files, and text based message files. The stored media files can include posted content of a user posted to social media website. Media files of a user can include payload data as well as metadata. System 100 can include metadata tagging functionality so that files stored in repository 152 are automatically tagged with metadata, e.g., that specifies such data as geographic location, a timestamp, filename identifiers and person identifiers associated to a file. User profile data of repository 152 can include e.g. user ID, preferences, contacts (e.g. "friends", "connections") and groups of a user.

Figure 2:
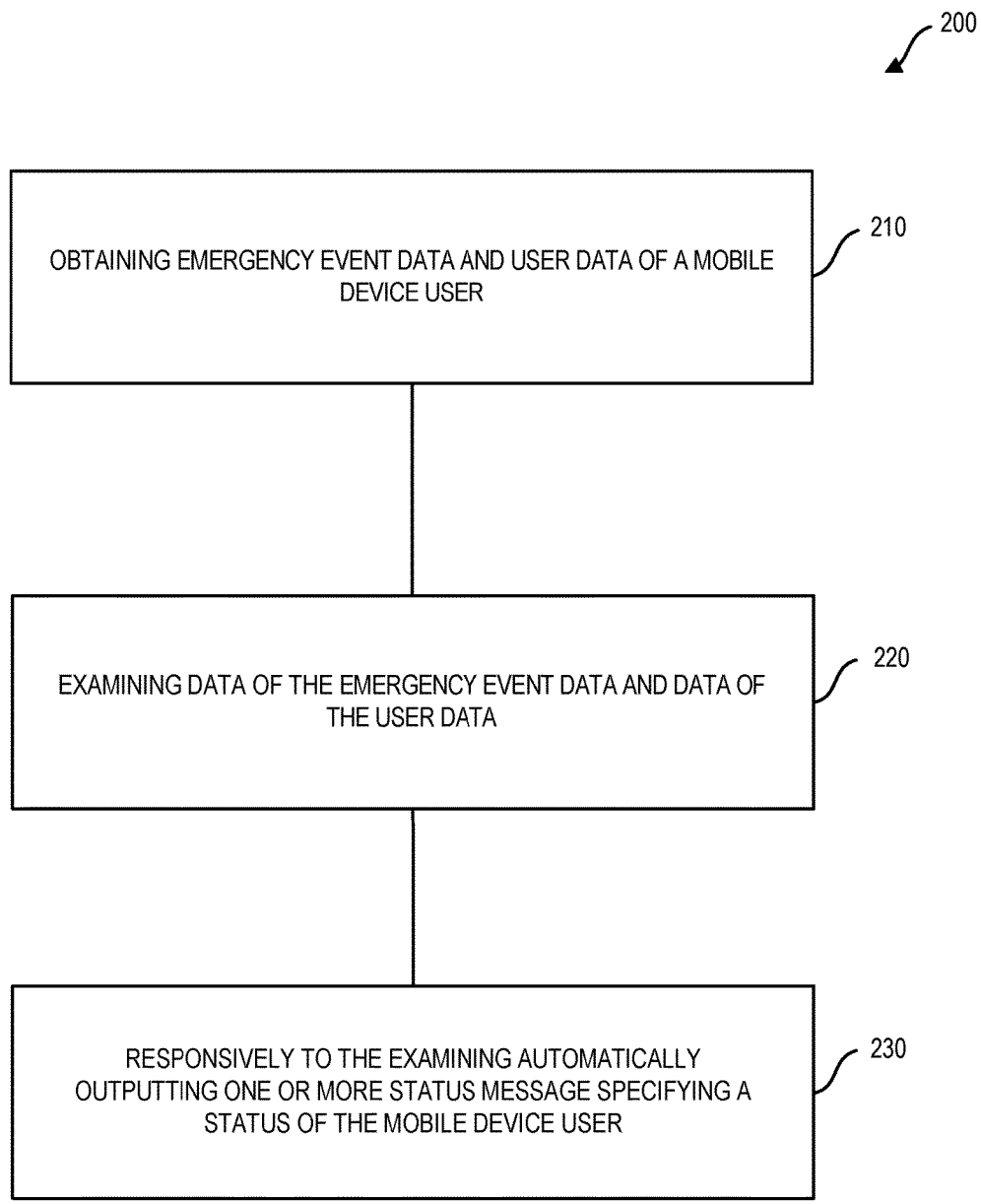
FIG. 2 is a flowchart illustrating a method for use in status message outputting one embodiment.

FIG. 2 is a flowchart illustrating a method 200 in accordance with one or more aspects set forth herein. At block 210 method 200 can include obtaining emergency event data and user data of a mobile device user. At block 220 method 200 can include examining data of the emergency event data and data of the user data. At block 230 method 200 can include responsively to the examining, automatically outputting a status message indicating a status of the mobile device user.

Figure 3:
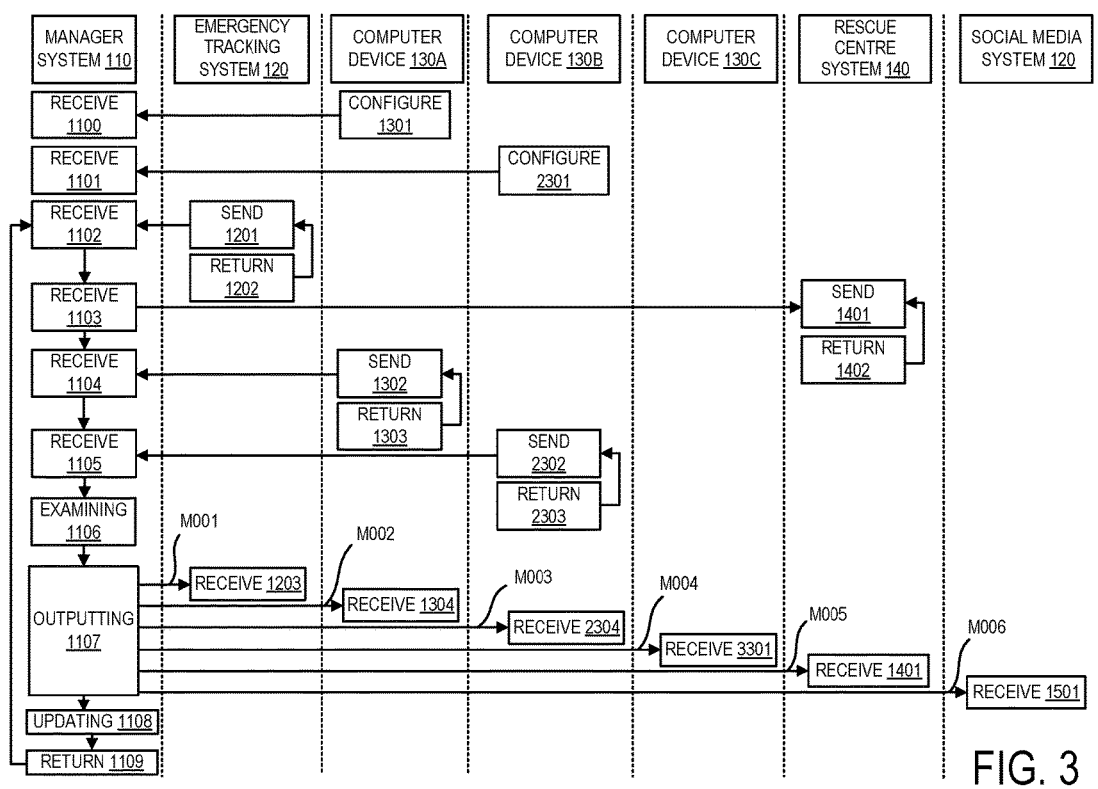
FIG. 3 is a flowchart illustrating a method for use in status message outputting in one embodiment.

A flowchart illustrating in one embodiment operation of system 100 is shown in FIG. 3, wherein exemplary functions are described with respect to manager system 110, emergency tracking system 120, rescue center system 140, social media system 150 user computer devices 130A, 130B and 130Z used by respective different users. Functions of manager system 110 described in reference to FIG. 3 set forth exemplary functions in accordance with method 200 as set forth in connection with the flowchart of FIG. 2 in one embodiment.

At blocks 1301 and 2301 respective users of computer device 130A and 110B can enter configuration data e.g. using a user interface of the respective computer devices 103A and 130B. At blocks 1301 and 2301 configuration data entered by respective users of computer device 130A and 130B can be sent to manager system 110. Manager system 110 at block 1100 can receive configuration data from computer device 130A. At block 1101 manager system 110 can receive configuration data from computer device 130B sent by computer device 130B at block 2301. Configuration data can include e.g. groups and classifications of users to whom message data should be sent to in the event of an emergency.

Manager system 110 at block 1102 can receive data from emergency tracking system 120 sent by emergency tracking system 120 at block 1201. Emergency tracking system 120 can be e.g. a weather service system, a crime tracking system, a fire tracking system. Emergency tracking system 120 in one embodiment can be provided by a newsfeed system. Manager system 110 can subject received unstructured data received from emergency tracking system 120 to processing by a Natural Language Processing (NLP) process to segment received text and voice data (e.g. from video content) and to tag such data with topic classifiers that can be emergency indicating topic classifiers. Manager system 100 can determine a location of an emergency identified using NLP tagging of data e.g. by output and identification of location indicating tags and/or by examining location tags of received video or image files associated to identified emergencies. On identification of an emergency and a location of an emergency, manager system can establish an emergency area geofence that can specify a two dimensional area of an emergency. Manager system 110 based on data from emergency tracking system 120 can granularly determine an area of an emergency. Where manager system 110 does not granularly determine an emergency area based on current data of a current manager system 110 can use predictive analytics to determine the emergency area e.g. based on sizes and shapes of emergencies for like classified emergencies.

Manager system 110 at block 1103 can receive data from rescue center system 140 sent by rescue center system 140 at block 1401. Rescue center system 140 can be e.g. a hospital ambulance unit, a fire department, a police department. Manager system 110 can receive structured data that indicates e.g. staffing, equipment, and location of a rescue team and/or can receive unstructured data from rescue center system and subject received data received from rescue center system 140 to processing by a Natural Language Processing (NLP) process to segment received text and voice data (e.g. from video content) and to tag such data with classifiers that facilitate identification staffing equipment and location of a rescue team.

At block 1104 manager system 110 can receive data from computer device 130A sent from computer device 130A at block 1302. At blocks 1301 and 2301 respective users of computer device 130A and computer device 130B can also enter health data e.g. using a user interface of the respective computer devices 103A and computer device 130B. At blocks 1301 and 2301 health data entered by respective users of computer device 130A and computer device 130B can be sent to manager system 110. Health data can include e.g. vital statistics of the user, e.g. age and gender, and health conditions, any medications used and the like.

At block 1105 manager system 110 can receive data sent from computer device 130B at block 2301. The sending of data by emergency tracking system 120 at block 1201 can be repeated e.g. on an open loop basis as indicated by return block 1202. The sending of data by emergency tracking system 140 at block 1401 can be repeated e.g. on an open loop basis as indicated by return block 1402. The sending of data by computer device 130A at block 1302 can be repeated by computer device 130A e.g. on an open loop basis as indicated by return block 1303. The sending of data by computer device 130B at block 2302 can be repeated e.g. on an open loop basis as indicated by return block 2303.

At block 1106 manager system 110 can perform examining of data received from emergency tracking system 120 at block 1103 and data received at one or more block 1104 or block 1105 from computer device 130A and/or computer device 130B. The processing performed at block 1106 can include processing to determine aspects of a current emergency as well as aspects of a present state of one or more user. In the ensuing description examining user data at block 1106 for purposes of emphasizing features and advantages is described in the context of examining user data of user device 130A. It will be understood that at block 1106 manager system 110 can be examining data of two or several (e.g. tens to hundred to millions of users) of user computer devices which have sent data to manager system.

At block 1107 manager system 110 can perform outputting of message data. The outputting at block 1107 can include outputting to different destinations e.g. the first message M001 can be output to emergency tracking system 120 for receipt at block 1203, the second message M002 can be output to computer device 130A for receipt at block 1304, a third message M003 can be output to computer device 130B for receipt at block 2304, a fourth message M004 can be output to computer device 130C for receipt at block 3301, a fifth message M005 can be output to rescue center system 140 for receipt at block 1401, and a sixth message M006 can be output to social media system 150 for receipt at block 1501. The various messages M001, M002, M003, M004, M005, and M006 can be differentiated so that each destination receives differentiated messages.

At block 1108 manager system 110 can perform updating e.g. so that processing performed at block 1106 is updated in view of new data received. Updating at block 1108 can include storing into data repository 112 data received at blocks 1101-1105 and messages output at block 1107. Manager system 110 in one embodiment can store data received at blocks 1101-1105 and messages output at block 1107 into user health data area 1124 so that health data for specific users is periodically updated based on received user data including biometric data. The receiving at blocks 1102, 1103, 1104, 1105 by manager system 110, the examining at block 1106, the outputting at block 1107, and the updating at block 1108 by manager system 110 can be repeated e.g. on an open loop basis as indicated by return block 1109.

Figure 5:
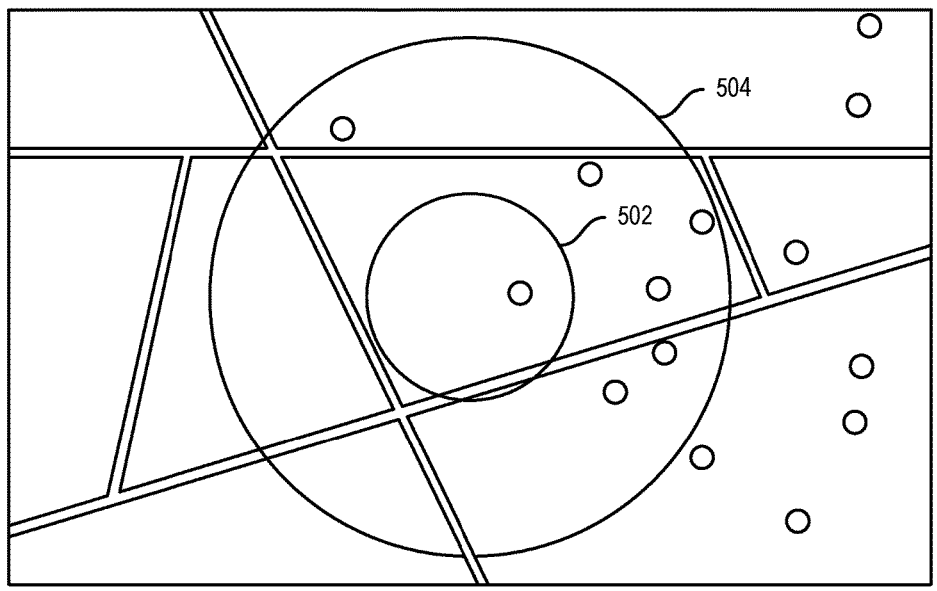
FIG. 5 depicts an emergency area geofence and an area of interest geofence in one embodiment.

Examining at block 1106 can include activating and performing various classifier processes. Manager system 110 performing an examining at block 1106 in one embodiment is described with reference to the flowchart of FIG. 4 and Table A herein below:

from a GPS sensor of a computer device e.g. computer device 130A. Manager system 110 can examine the GPS output data in reference to one or more geofence established based on emergency tracking data received from emergency tracking system 120 at block 1102. Referring to FIG. 5 the one or more geofence can include e.g. a geofence 502 defining an emergency area and in one embodiment a perimeter of an emergency area i.e. the area of an emer-

TABLE A

| Classifier Process | Data | Classification 1 | Classification 2 | Classification 3 | Classification 4 |
|---|---|---|---|---|---|
| User Location | GPS | GPS data indicates device is within emergency area geofence | GPS data indicates device is external to emergency area geofence and within interest area geofence | GPS data indicates device is external to interest area geofence | GPS data indicates device is at healthcare center |
| | | "is in the emergency area" | "is out of the emergency area" or "will be in the emergency area" | — | "is at [hospitalname] Hospital" |
| Vital Signs | Pulseometer | Heart Rate is in normal range | Heart Rate is out of normal range | — | — |
| | | "is doing OK" | — | — | — |
| Activity | Computer Device Transaction Log Data | User-initiated transaction(s) have occurred within current time window | User-initiated transaction(s) have not occurred within current time windows | — | — |
| | | "is using [his/her] device" | — | — | — |
| Mobility | GPS | GPS Data indicates that device is not moving from location to location | GPS data indicates that device is moving in uncertain direction | GPS data indicates that device is moving in certain direction | — |
| | | "is stuck" | "is moving around" | "is moving from [location] to [location]" | — |
| Rescue Location | Rescue Center Feed | Feed data indicates rescue team within emergency area geofence | Feed data indicates rescue team not within emergency area geofence | — | — |
| | | "Rescue Team [team identifier] is nearby" | — | | |

Table A describes various operations that can be performed by manager system 110, as part of performing different classifier processes in one embodiment.

Figure 4:
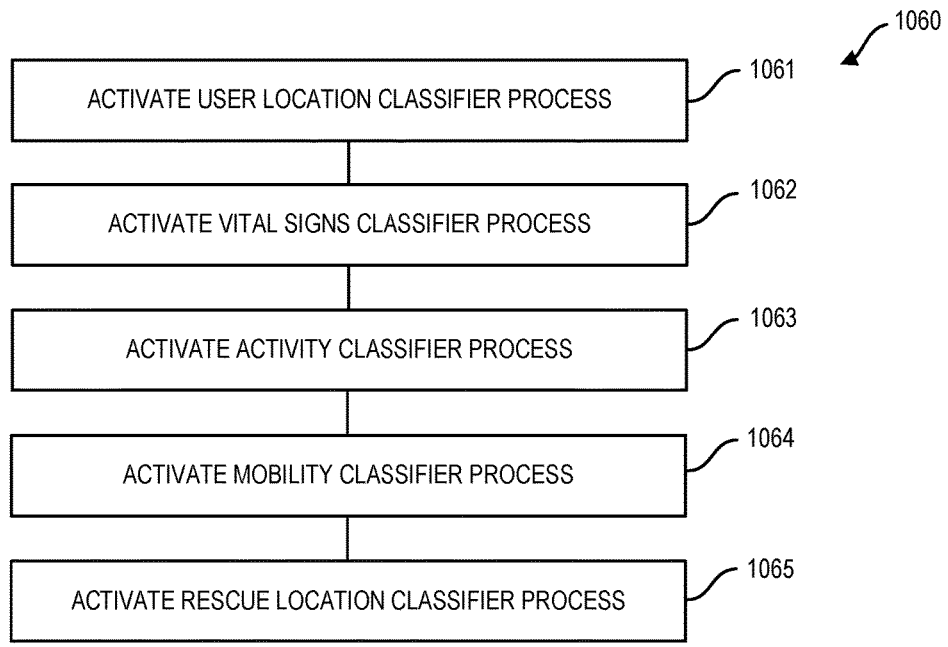
FIG. 4 is a flowchart illustrating a method for use in examining data of a computer device user in one embodiment.

Regarding process 1060 set forth in the flowchart of FIG. 4 manager system 110 at block 1061 can activate user location classifier process 113. At block 1062 manager system 110 can activate vital signs classifier process 114. At block 1063 manager system 110 can activate activity classifier process 115. At block 1064 manager system 110 can activate mobility classifier process 116. At block 1065 manager system 110 can activate rescue location classifier process 117.

At block 1061 manager system 110 with user location classifier process 113 activated can examine data output gency. The one or more geofence can also include a geofence 504 defining an area of interest and in one embodiment a perimeter of an area of interest. Embodiments herein recognize that it can be useful to examine an area outside of an emergency area such as areas in proximity with an emergency area. Embodiments herein also recognize that examining of areas spaced significantly from an emergency system can result in messages being sent that may detract attention from more important messages. Each of geofence 502 and geofence 504 can extend over a two dimensional area.

Accordingly, manager system 110 can define an area of interest based on an emergency area. Manager system 110 can establish a geofence 504 defining an area of interest to encompass and to be larger than geofence 502 defining an emergency area. Manager system 110 can establish geofence 504 to have an area that is larger than an area of geofence 502, e.g. 1.5 times larger, 2 times larger, 5 times larger.

Manager system 110 at block 1061 can examine user location data and geofence data to determine a location classification of a current user and user compute device e.g. computer device 130A out of a plurality of candidate classifications. According to Table A one candidate user location classification (1) is that the GPS data indicates that computer device 130A is within an emergency area geofence 502. Another candidate user location classification (2) is that the GPS data from device 130A indicates that the computer device 130A is at a location external to an emergency area geofence 502 and within an area of interest geofence 504. Another candidate user location classification (3) as listed in Table A is that the GPS data of computer device 130A indicates that device 130A is external to an area of interest geofence 504. Another candidate user location classification (4) as indicated in Table A is that the GPS data of computer device 130A indicates that the computer device 130A is at a healthcare center e.g. a hospital. For classification into classification 4 of the user location classifier manager system 110 can use data of map area 1122 of data repository 112. In one embodiment at block 1061, manager system 110 can examine GPS data of a user computer device 130A can establish one classification for the user location and the GPS data out of a plurality of candidate classifications e.g. out of the candidate classifications 1, 2, 3, and 4 listed in Table A.

Referring to block 1062 manager system 110 can examine pulsometer output data obtained from a pulseometer e.g. as output by computer device 130A and as received by 130A in one embodiment from associated wearable computer device 131A. At block 1062 manager system 110 can examiner pulsometer data to determine a classification for user of computer device 130A out of a limited number of candidate classifications. Referring to Table A exemplary candidate classifications can include the classification (1) that user heart rate is in a normal range and the candidate classification (2) that the user heart rate is out of a normal range.

At block 1063 manager system 110 can activate an activity classifier process 115 and examine data of a computer device transaction log that logs transactions of user computer device 130A. Manager system 110 can examine transaction log data and can classify user activity into one of a limited number of candidate classifications. Candidate classifications as indicated in Table A can include (1) the classification that the user-initiated transaction has occurred within a current time window in candidate classification (2) that a user-initiated transaction has not occurred within a current time window.

At block 1064 manager system 110 can activate a mobility classifier process 116. For performance of block 1064 manager system 110 can examine GPS data output by computer device 130A and can classify the mobility of a user of computer device 130A into one of a limited number of candidate classifications. Candidate classifications can include e.g. classification (1) that GPS data indicates that the user computer device is not moving from location to location, and candidate classification (2) that GPS data of the user computer device indicates that the computer device is moving in an uncertain direction, and candidate classification (3) that the GPS data of the user device indicates that the computer device 130A device is moving in a certain direction e.g. south or east.

At block 1065 manager system 110 can examine data received from rescue center system 140A together with geofence data. Manager system 110 can classify rescue team location into one of a limited number of candidate classifications. Classifications can include (1) the candidate classification that feed data indicates that a rescue team is within an emergency area geofence and the classification (2) that rescue center indicates that the rescue team is not within an emergency area geofence 502.

At block 1107 manager system 110 can activate status message generating process 118. At block 1107 manager system 110 can lookup text segments from a lookup table that associates text segments to data classifications performed at block 1106. In Table A, there is shown various text segments associated to data classifications. Manager system 110 can select text segments that are specified in Table A, for example if classification (1) for the user location classifier is active, manager system 110 can select the text segment "is in danger zone." If classification (1) is active for the vital signs classifier, manager system 110 can select the text segment "is doing ok." If classification (1) is active for the activity classifier process, manager system 110 can select the text segment "is using device." If classification (1) is active for the mobility classifier, manager system 110 can select the text segment "is stuck." If classification (1) is active for the rescue location classifier, manager system 110 can select the text segment "rescue team is nearby."

In some instances, manager system 110 in performing text lookup using lookup tables such as illustrated in Table A can look up additional designating information e.g. from data repository 112. For example, status messages provided by text based messages that are generated can be personalized to include the name of the user of user device 130A that can be looked up from user configuration data area 1123 of data repository. Regarding the text segment for classification (4) under the user location classifier, manager system 110 can look up e.g. from maps area 1122 of repository 112 the name of the hospital at which the use is located. Regarding classification (1) of the rescue location classifier, manager system 110 can specify an identifier for the rescue team e.g. as received at block 1103. Thus a person receiving a message on the status of a user of computer device 130A can contact the rescue team to learn more about the condition of the user. In the event classification (3) is active for the mobility classifier (indicating that a device is moving in a certain direction) manager system 110 can use map data from maps area 1122 to determine and to specify the exited location and the destination location. Status message generating process 118 can include grammar and spellcheck software for providing of transitional phrases and assembly of text segments into complete grammatically correct and easily understood sentences. Regarding classification (2) of the user location classifier, manager system 110 in some instances can determine that a user is not currently within an emergency area geofence 502 but can predict that it is imminent that a user will be in an emergency area geofence 502, e.g. based on movement or expansion of an emergency area (e.g. a movement or expansion of a weather event such as a storm, tornado, or flood), and/or based on movement of a user. In such instances manager system 110 can select a more granular and specific text based description corresponding to the classification of being external to the emergency area genofence, e.g. the text descriptor "will be in the emergency area".

With use of various classifier processes and a text generating process it will be understood that a wide range of informative granular status messages can be provided automatically using passively obtained user data passively obtained without dependence on obtaining any manually entered user data defined by a user of computer device 130A using a manually operated user interface. Some examples include "Jane is out of the emergency area and is doing OK"; "Jane is in the emergency area and is doing OK"; "Jane is in the emergency area and is doing OK. Rescue Team Tri-State is nearby"; "Jane is doing OK but is stuck. Rescue Team Tri-State is nearby"; "Jane is using her device in the emergency area"; "Jane is doing OK. She is using her device in the emergency area and is moving around the emergency area"; "Jane is doing OK and is at Tri-State Hospital"; "Jane is moving from the emergency area to a safe area." Jane is moving from the emergency area to Tri-State Hospital"; "Jane will be in the emergency area".

Embodiments herein recognize that it can be advantageous to restrict information transmitted with messages output at block 1107. For example if message information that is transmitted specifying a user's status is too negative unwanted consequences might be engendered, such as untrained persons travelling to the emergency area. Embodiments herein recognize that optimal response to an emergency can be yielded by transmission of messages that have detail but which may not be so detailed as to engender unwanted consequences such as untrained persons entering an emergency area. At the same time embodiments herein recognize that it can be advantageous to deliver additional information to certain classifications of users. Embodiments herein recognize that succinct yet detailed and easily understood messages to certain recipients combined with more detailed information messages to other recipients can promote an optimal response to an emergency.

Figure 6:
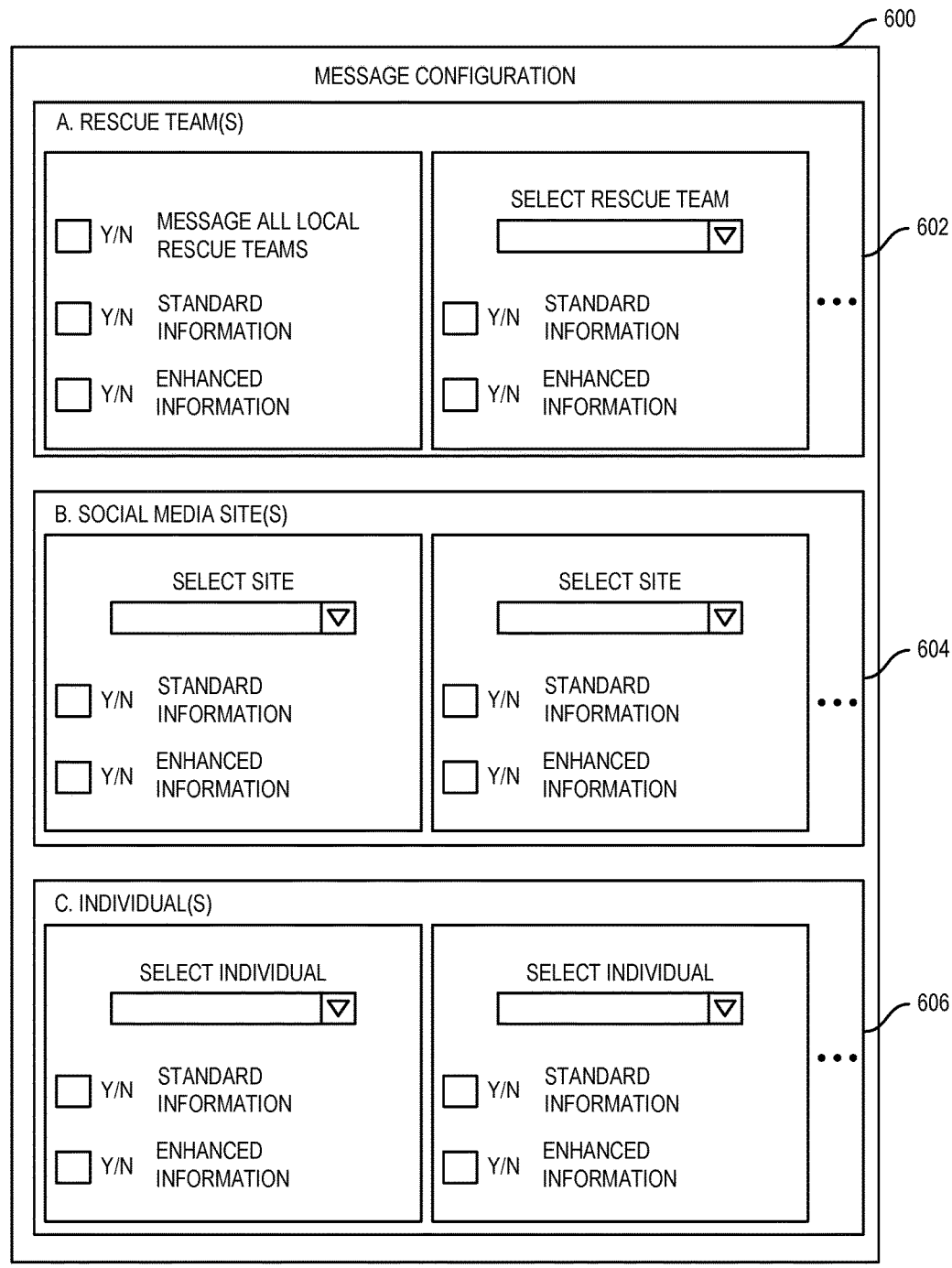
FIG. 6 illustrates a user interface for defining recipients of status messages and content of status messages.

It has been noted that messages M001-M006 output by manager system 110 at block 1107 can be differentiated. In one embodiment the differentiation between messages on the status of the user of computer device 130A can be based on user defined configuration data defined at block 1301 by a user using a user interface displayed on computer device 130A. In one embodiment a user using a user interface of computer device 130A can specify that a first one or more message recipient receives standard message information as set forth in Table A and that a second one or more message recipient receive additional status information in addition to the information of the standard information. For example using a user interface such as user interface 600 of FIG. 6, which can be displayed on a display of computer device 130A a user of computer device 130A can specify that different recipients receive different messages. Certain one or more recipients can receive standard message information and certain one or more recipients can receive enhanced information. It will be understood that while more than two levels of information can be specified, two levels are explained for purposed of explaining features and advantages. Referring to user interface 600 a user can use area 602 to specify rescue team (and thereby rescue center system) recipients and message content (e.g. standard or enhanced) for the specified rescue team recipients, area 604 to specify social media site (and thereby social media system) recipients and message content (e.g. standard or enhanced) for the specified social media recipients, and area 606 to specify individual (and thereby certain computer device) recipients and message content (e.g. standard or enhanced) for the specified individual recipients. In one embodiment a user can specify that social media sites and most individuals receive standard information status messages and that rescue teams and certain special status individuals receive enhanced information. For example, referring to the flowchart of FIG. 3 based on user defined configuration data, messages M001, M002, M003, and M006 can be standard information messages and messages M004 (send to certain computer device 130Z) and M005 (sent to rescue center system 140) can be enhanced information messages. The user of computer device 130A can use user interface 600 to specify that the certain individual associated to computer device 130Z and the rescue team associated to rescue center system 140 receive enhanced status messages. Special status individuals can include e.g. personal physicians, a domestic partner, a child, a parent, a best friend, an estate trustee and the like. In one embodiment, system 100 can be configured so that a user is restricted from specifying that a social media site receives other than standard information status messages. In one embodiment, system 100 can be configured so that rescue teams by default always receive enhanced information status messages. In one embodiment, system 100 can be configured so that rescue teams by default always receive enhanced information status messages unless the default configuration is overridden by user selection.

Enhanced information which can be selected for delivery using user interface 600 can be differentiated from standard information in a variety of respects. In one embodiment, enhanced information can include numerical biometric data such as actual heart rate in beats per minute Enhanced information can include information determined by examining data outputs of an additional one or more biometric sensor. For example a standard information status message can be determined by examining data outputs of a first set of one or more biometric sensor and the enhanced information status message can be determined by examining data outputs of a second set of one or more biometric sensor where the second sent includes one or more biometric sensor not included in the first set. In one embodiment the second set can be a superset of the first set that includes the first set. In one embodiment an enhanced status message can be determined by examining output of additional one or more biometric sensors not subject to examination for determining a standard information status message. The additional one or more biometric sensor can include e.g. a blood pressure sensor, a body temperature sensor, and/or a skin conductivity sensor. In one embodiment, such biometric sensors can be disposed in wearable computer device 131A associated to computer device 130A. Enhanced information status messages can also include e.g. health information from user health area 124 of data repository 112 which can be uploaded to data repository 112 by a user and can be added to during periodic performances of updating at block 1108. Health information can include e.g. age, gender, medical condition and/or medication information which can be useful to rescue team Enhanced information status messages can also include e.g. coordinate location information that specifies precise geographic coordinate location of a user.

In one aspect, manager system 110 contemporaneously with sending status message M006 at block 1107 to rescue center system 140 specifying a status of a first user e.g. a user of computer device 130A can send one or more messages to rescue center system 140 specifying information of one or more additional users such as including the status of a user of computer device 130B. Advantageously, a rescue team receiving enhanced information status messages specifying status of multiple users can use the information to plan and implement enhanced rescue operations, e.g. by adapting rescue personnel and/or equipment in view of the enhanced status information which can include enhanced information on the location and current medical condition status of multiple users.

Certain embodiments herein may offer various technical computing advantages, involving computing advantages to address problems arising in the realm of computer networks. For example a fundamental operation of a computer system is the input of data and embodiments herein provide for enhanced data input e.g. receiving input data of a user without dependence on interactions of a user with a manually operated user interface, and also provide for transformation of input data of user obtained without dependence on interactions of a user with a manually operated user interface into text based messages discernible by recipient users. Recognizing that according to a fundamental aspect computer aspect computer networks may fail during an emergencies, embodiments herein provide for automatic and periodic delivery of current status messages to optimize operation of a network on the contingency of network failure. Embodiments herein can employ a variety of data structuring technologies that can facilitate artificial intelligence decision making. Data structuring technologies can include for example a user location classifier process, a vital signs classifier process, an activity classifier process, a mobility classifier process, and/or a rescue team location classifier process. Artificial intelligence technologies can include a status message generating process that can generate discernible text based messages based on an output of one or more data classifier process. Embodiments herein can provide results and advantages that are not possible or practical without use of components of a technical computing environment, such as the data input, data structuring and artificial intelligence features described as well as providing for coordinated status message delivery message to recipients in real time on an automated basis during an emergency where real time response is required for delivery of current status messages and with status message delivery being automatically differentiated between users.

Figure 7:
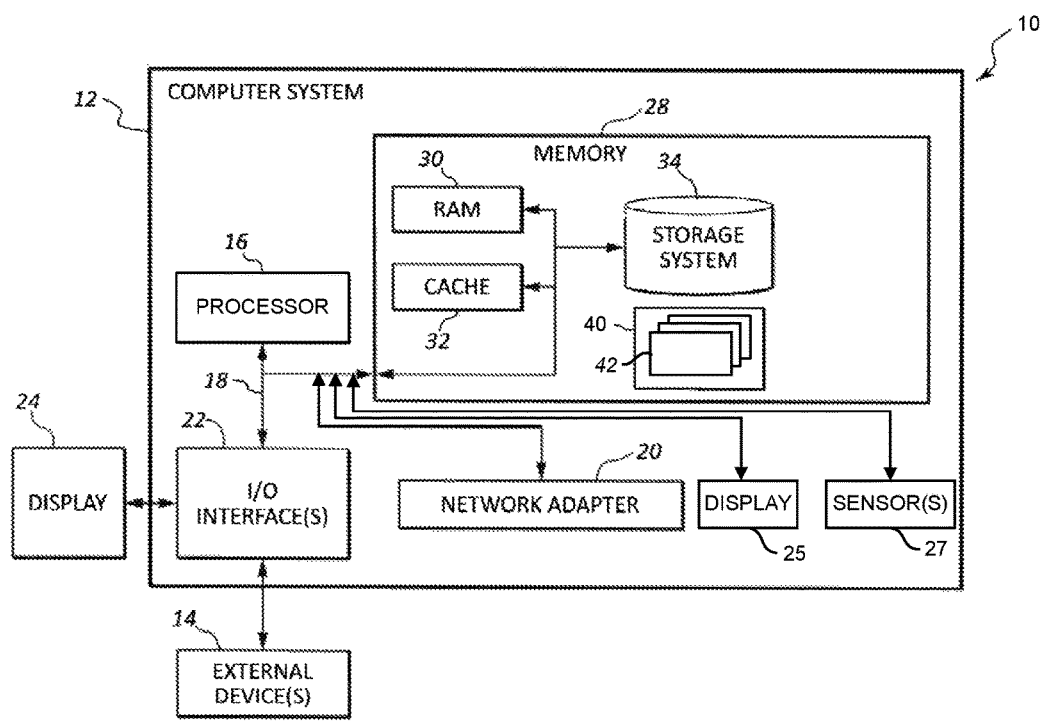
FIG. 7 depicts a computing node according to one embodiment.
Figure 8:
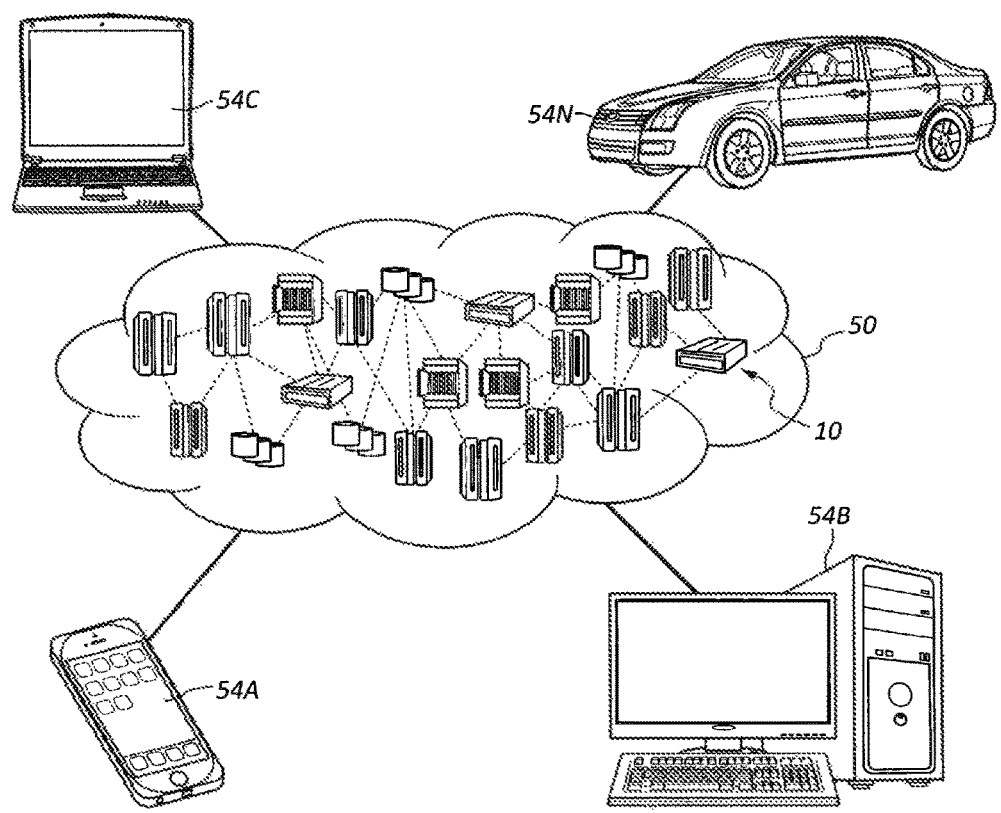
FIG. 8 depicts a cloud computing environment according to one embodiment.
Figure 9:
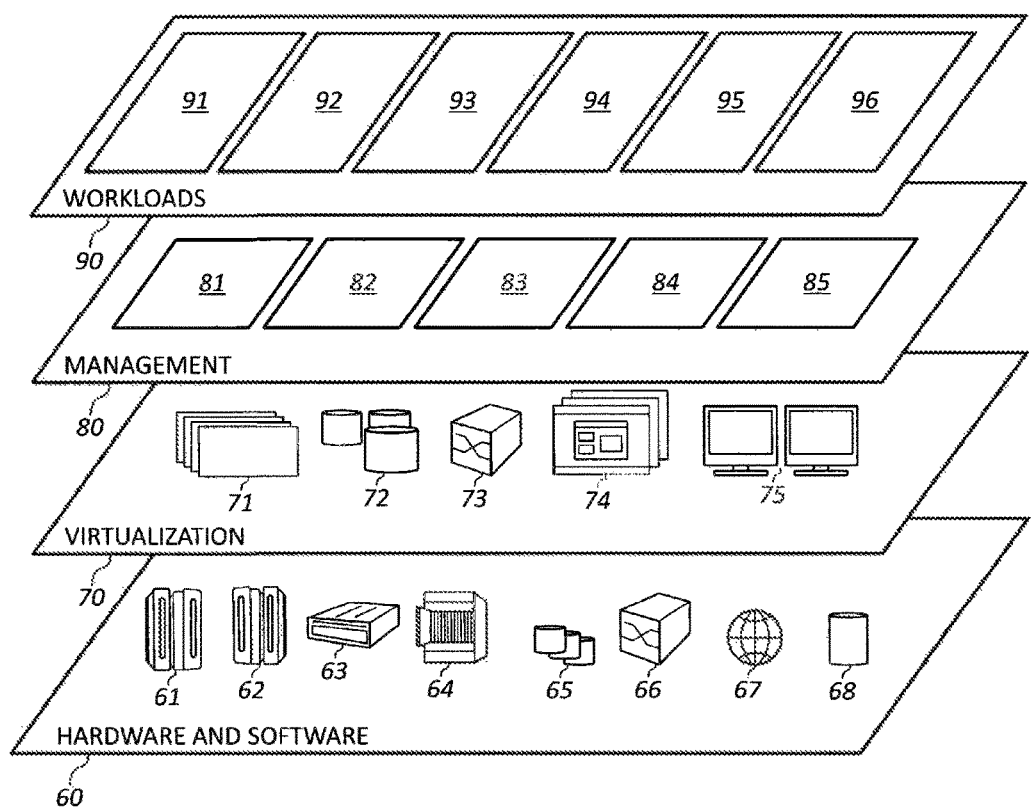
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, and the functions described with reference to manager system 110 as set forth in the flowchart of FIG. 3 and the flowchart of FIG. 4. In one embodiment, emergency tracking system 120 can include one or more computing node 10 and can include one or more program 40 for performing functions described with reference to emergency tracking system 120 as set forth in the flowchart of FIG. 3. In one embodiment, rescue center system 140 can include one or more computing node 10 and can include one or more program 40 for performing functions described with reference to rescue center system 140 as set forth in the flowchart of FIG. 3. In one embodiment, social media system 150 can include one or more computing node 10 and can include one or more program 40 for performing functions described with reference to social media system 150 as set forth in the flowchart of FIG. 3. In one embodiment, one or more user computer device 130A, 130B-130Z can include one or more computing node 10 and can include one or more program 40 for performing functions described with reference to one or more user computer device 130A, 130B-130Z as set forth in the flowchart of FIG. 3.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 can include one or more network adapter 20.

Computer system 12 in one embodiment can also include one or more sensor 27 connected to bus 18. One or more sensor 27 can alternatively be connected through I/O interface(s) 22. One or more sensor 27 can include a Global Positioning Sensor (GPS) device in one embodiment and can be configured to provide a location of computing node 10. In one embodiment, one or more sensor 27 can alternatively or in addition include, e.g., one or more blood pressure (bp) sensor, one or more pulsometer, one or more skin conductivity sensor, or one or more audio input device one or more of a camera, one or more gyroscope, one or more temperature sensor, one or more humidity sensor. As noted, in some embodiments a user can use a plurality of computer device, e.g. can use a computer device 130A and an associated computer device 131A. In one embodiment computer device 130A can be provided e.g. by a smartphone and associated computer device 130A can be provided by a smartwatch that is configured to automatically upload sensor data to computer device 130A which data can be uploaded to manager system 110. In such an embodiment, the noted types of one or more sensor 27 can be duplicated between the associated computer devices e.g. computer devices 130A and computer device 131A or distributed between the computer devices so that some of the one or more sensors are in disposed in one of the computer devices and other of the one or more sensors 27 are disposed in the remaining computer device. It can be advantageous to dispose certain types of biometric sensors in a smartwatch, e.g. a pulsometer, a blood pressure sensor, skin conductivity sensor, in view of the persistent position of a smart watch in proximity with a user's body. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for emergency status message delivery as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining, by one or more processor, emergency event data and user data of a mobile device user, wherein the user data of the mobile device user includes user biometric data obtained from a mobile device of the mobile device user;
examining, by the one or more processor, data of the emergency event data and data of the user data, wherein the examining includes activating a user location classifier process that uses location data of the mobile device and geofence data determined from the data of the emergency event data to classify a location of the mobile device user, and wherein the activating further includes activating a vital signs classifier process that uses biometric data obtained from the mobile device to classify a vital sign condition of the mobile device user; and
responsively to the examining, automatically outputting, by the one or more processor, one or more text based status message specifying a status of the mobile device user, wherein the automatically outputting includes activating a status message generating process that generates a text based message based on an output of the user location classifier process and the vital signs classifier process, wherein the one or more text based status message specifying a status of the mobile device user includes a text based message output to a recipient user other than the mobile device user, wherein the text based message is discernible by the recipient user, wherein the method includes combining first, second, and third text segments together to provide the text based message, wherein the first text segment is text segment specifying a location of the mobile device user and is based on a determined location classifier for the mobile device user, wherein the second text segment is a text segment specifying vital sign information of the mobile device user and is based on a determined vital sign classifier for the mobile device user, and wherein the third text segment is a segment specifying a capacity of the mobile device user to move and is based on a determined mobility classifier for the mobile device user, wherein the first text segment is selected using a first lookup table that associates location specifying text segments to location classifiers for the mobile device user, wherein the second text segment is selected using a second lookup table that associates vital signs information specifying text segments to vital sign classifiers for the mobile device user, wherein third text segment is selected using a third lookup table that associates movement capacity specifying text segments to mobility classifiers for the mobile device user.

2. The method of claim 1, wherein the obtaining includes passively obtaining the user data of a mobile device user independent of use of a manually operated user interface of the mobile device by the mobile device user.

3. The method of claim 1, wherein the examining includes activating one or more of the following selected from the group consisting of: (a) an activity classifier process that uses transaction log data of the mobile device to classify mobile device use activity of the mobile device user; (b) a mobility classifier process that uses location data of the mobile device to classify a mobility of the mobile device user, and (c) a rescue team location classifier process that uses data obtained from a rescue center system to classify a location of a rescue team.

4. The method of claim 1, wherein the automatically outputting includes activating a status message generating process that generates a text based message based on an output of one or more the following selected from the group consisting of: (a) an activity classifier process that uses transaction log data of the mobile device to classify mobile device use activity of the mobile device user; and (b) a mobility classifier process that uses location data of the mobile device to classify a mobility of the mobile device user.

5. The method of claim 1, wherein the examining includes activating a user location classifier process that uses location data of the mobile device and geofence data determined from the data of the emergency event data to classify a location of the mobile device user, wherein the geofence data includes an emergency area geofence that specifies a first area, and a location of interest geofence, the location of interest geofence being larger than and encompassing the first area.

6. The method of claim 1, wherein the automatically outputting includes outputting a standard information status message to first one or more recipients, and outputting an enhanced information status message to second one or more recipients, wherein the first one or more recipients includes a social media website; and wherein the second one or more recipients includes a rescue center system.

7. The method of claim 1, wherein the emergency event data is data of a weather service.

8. The method of claim 1, wherein the examining includes comparing a location of the user to information specifying location of hospitals, wherein the automatically outputting includes conditionally outputting a status message specifying that the user is at a hospital conditionally on the condition that the examining determines that the user is at a hospital.

9. The method of claim 1, wherein the automatically outputting is performed based on user entered configuration settings of the user, the user entered configuration settings being entered using a manually operated user interface.

10. The method of claim 1, wherein the examining includes activating one or more of the following classifier processes selected from the group consisting of: (a) an activity classifier process that uses transaction log data of the mobile device to classify mobile device use activity of the mobile device user; (b) a mobility classifier process that uses location data of the mobile device to classify a mobility of the mobile device user, and (c) a rescue team location classifier process that uses data obtained from a rescue center system to classify a location of a rescue team, wherein the outputting includes activating a status message generating process that generates a text based message based on an output of the one or more classifier processes, wherein the automatically outputting includes outputting a standard information status message to first one or more recipients, and outputting an enhanced information status message to second one or more recipients, wherein the enhanced information message is enhanced relative to the standard information message by inclusion of one or more of the following selected from the group consisting of: (i) numerical biometric data; (ii) content determined by examining an output of one or more additional sensor; (iii) health information of the mobile device user previously uploaded to a data repository by the mobile device user; and (iv) a coordinate location of the mobile device user, and wherein the obtaining includes obtaining the user data of a mobile device user independent of use of a manually operated user interface of the mobile device by the mobile device user.

11. The method of claim 1, wherein the automatically outputting includes outputting a standard information status message to a first recipient, and outputting an enhanced information status message to second recipient, wherein each of the first recipient and the second recipient are other than the mobile device user, wherein the enhanced information status message is enhanced relative to the standard information status message by inclusion of each of the following: (a) numerical biometric data; (b) content determined by examining an output of one or more additional sensor; (c) health information of the mobile device user previously uploaded to a data repository by the mobile device user; and (d) a coordinate location of the mobile device user.

12. A computer program product comprising:
a computer readable storage medium readable by one or more processing unit and storing instructions for execution by one or more processor for performing a method comprising:
obtaining emergency event data and user data of a mobile device user, wherein the user data of the mobile device user includes user biometric data obtained from a mobile device of the mobile device user;
examining data of the emergency event data and data of the user data, wherein the examining includes activating a user location classifier process that uses location data of the mobile device and geofence data determined from the data of the emergency event data to classify a location of the mobile device user, and wherein the activating further includes activating a vital signs classifier process that uses biometric data obtained from the mobile device to classify a vital sign condition of the mobile device user; and
responsively to the examining, automatically outputting one or more text based status message specifying a status of the mobile device user, wherein the automatically outputting includes activating a status message generating process that generates a text based message based on an output of the user location classifier process and the vital signs classifier process, wherein the one or more text based status message specifying a status of the mobile device user includes a text based message output to a recipient user other than the mobile device user, wherein the text based message is discernible by the recipient user, wherein the method includes combining first, second, and third text segments together to provide the text based message, wherein the first text segment is text segment specifying a location of the mobile device user and is based on a determined location classifier for the mobile device user, wherein the second text segment is a text segment specifying vital sign information of the mobile device user and is based on a determined vital sign classifier for the mobile device user, and wherein the third text segment is a segment specifying a capacity of the mobile device user to move and is based on a determined mobility classifier for the mobile device user, wherein the first text segment is selected using a first lookup table that associates location specifying text segments to location classifiers for the mobile device user, wherein the second text segment is selected using a second lookup table that associates vital signs information specifying text segments to vital sign classifiers for the mobile device user, wherein third text segment is selected using a third lookup table that associates movement capacity specifying text segments to mobility classifiers for the mobile device user.

13. The computer program product of claim 12, wherein the examining includes activating each of the following: (a) an activity classifier process that uses transaction log data of the mobile device to classify mobile device use activity of the mobile device user; (b) a mobility classifier process that uses location data of the mobile device to classify a mobility of the mobile device user, and (c) a rescue team location classifier process that uses data obtained from a rescue center system to classify a location of a rescue team.

14. The computer program product of claim 12, wherein the outputting includes activating a status message generating process that generates a text based message based on each of the following: (a) an activity classifier process that uses transaction log data of the mobile device to classify mobile device use activity of the mobile device user; and (b) a mobility classifier process that uses location data of the mobile device to classify a mobility of the mobile device user.

15. The computer program product of claim 13, wherein the automatically outputting includes outputting a standard information status message to first one or more recipients, and outputting an enhanced information status message to second one or more recipients, wherein the enhanced information status message is enhanced relative to the standard information status message by inclusion of each of the following: (a) numerical biometric data; (b) content determined by examining an output of one or more additional sensor; (c) health information of the mobile device user previously uploaded to a data repository by the mobile device user; and (d) a coordinate location of the mobile device user.

16. The computer program product of claim 12, wherein the method includes based on GPS data of the mobile device indicating that the mobile device is not moving providing the third text segment to specify that the mobile device user is stuck.

17. A system comprising:
a memory;
at least one processor in communication with the memory; and
program instructions executable by one or more processor via the memory to perform a method comprising:
obtaining emergency event data and user data of a mobile device user, wherein the user data of the mobile device user includes user biometric data obtained from a mobile device of the mobile device user;
examining data of the emergency event data and data of the user data, wherein the examining includes activating a user location classifier process that uses location data of the mobile device and geofence data determined from the data of the emergency event data to classify a location of the mobile device user, and wherein the activating further includes activating a vital signs classifier process that uses biometric data obtained from the mobile device to classify a vital sign condition of the mobile device user; and responsively to the examining, automatically outputting one or more text based status message specifying a status of the mobile device user, wherein the automatically outputting includes activating a status message generating process that generates a text based message based on an output of the user location classifier process and the vital signs classifier process, wherein the automatically outputting includes outputting a standard information status message to a first recipient, and outputting an enhanced information status message to second recipient, wherein each of the first recipient and the second recipient are other than the mobile device user, wherein the enhanced information status message is enhanced relative to the standard information status message by inclusion of each of the following: (a) numerical biometric data; (b) content determined by examining an output of one or more additional sensor; (c) health information of the mobile device user previously uploaded to a data repository by the mobile device user; and (d) a coordinate location of the mobile device user.

18. The system of claim 17, wherein the method includes the mobile device user using a user interface to select (i) the first recipient, and (ii) the second recipient.

\* \* \* \* \*